Nov. 21, 1939. H. E. METCALF 2,180,688
STEERING COLUMN DIRECTIONAL SIGNAL SWITCH
Filed Jan. 31, 1938 2 Sheets-Sheet 1
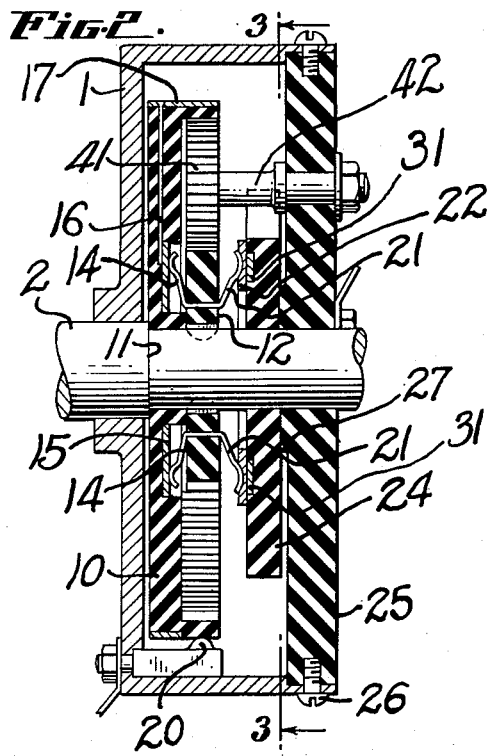
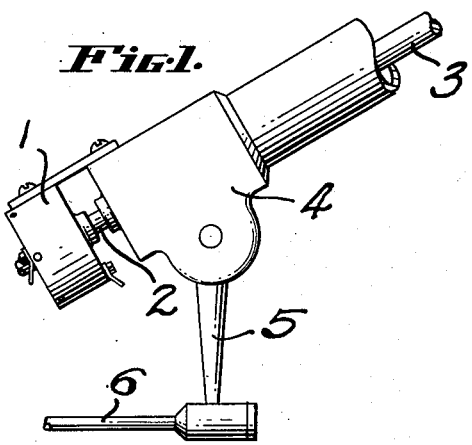
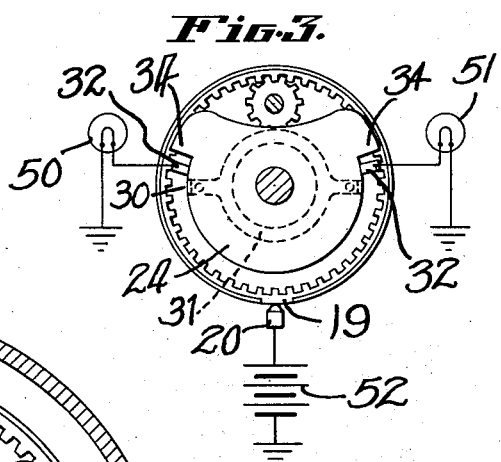
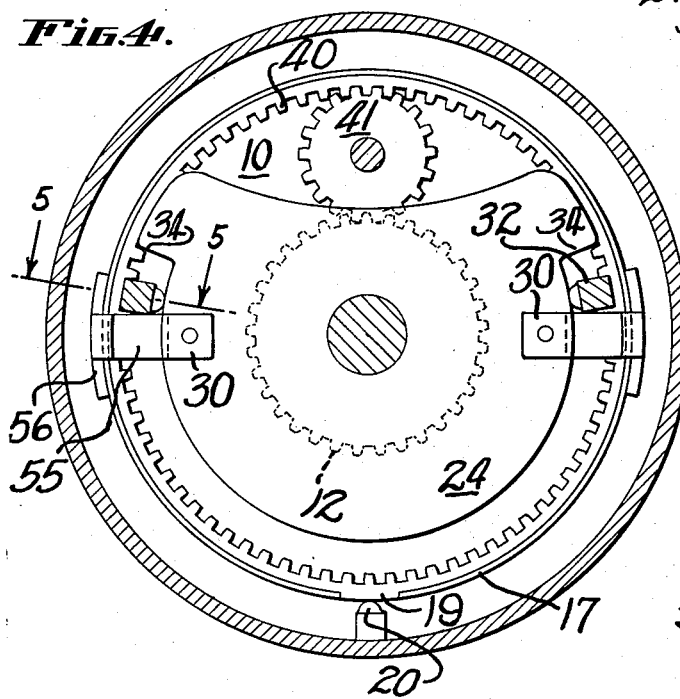
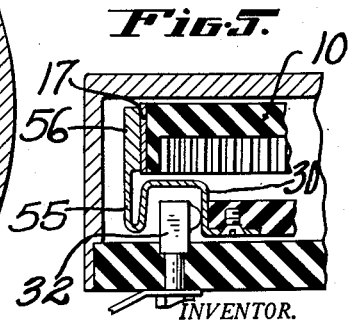
INVENTOR.
HERBERT E. METCALF.
BY Lippincott & Metcalf
ATTORNEYS.

Nov. 21, 1939.  H. E. METCALF  2,180,688

STEERING COLUMN DIRECTIONAL SIGNAL SWITCH

Filed Jan. 31, 1938  2 Sheets-Sheet 2

INVENTOR.
HERBERT E. METCALF
BY Lippincott & Metcalf
ATTORNEYS.

Patented Nov. 21, 1939

2,180,688

UNITED STATES PATENT OFFICE 2,180,688

STEERING COLUMN DIRECTIONAL SIGNAL SWITCH

Herbert E. Metcalf, Walnut Creek, Calif., assignor to E. H. Kueffer, Oakland, Calif.

Application January 31, 1938, Serial No. 187,878

8 Claims. (Cl. 177—339)

My invention relates to directional signal switches, and more particularly, to such a switch that can be mounted to rotate directly on the steering column of a vehicle, or at steering column speed of rotation, or which is suitable for use in conjunction with any shaft having a restricted cycle of operation.

The present invention is a modification and an improvement on the general type of switch described and claimed by Clarence B. Howard in his United States Patent No. 2,103,287, issued December 28, 1937, entitled "Double circuit rotary switch", and is so modified that it may be mounted directly upon the steering column of a vehicle wherein more than one revolution of the column is used in the steering cycle.

In another application entitled "Vehicle signalling system", Serial No. 160,007, filed August 20, 1937, Howard has shown how a particular type of switch may be applied to an automotive vehicle to provide automatic right and left signalling upon a vehicle being turned from a straight-away course, the signal being changed and reversed whenever the amount of turn is reduced or reversed. The Howard switch contained means therein rotating at the shaft speed for preventing any circuit connection through the switch within a predetermined steering arc, which includes the straight-away path, and in my application entitled "Vehicle signalling means and method", Serial No. 173,211, filed November 6, 1937, I have described and claimed a switch of the same general character wherein the steering angle including the straight-away path, is confined to predetermined values right and left of the straight-away path of travel.

Howard may mount his device, for example, either on the quadrant nut of the steering gear, in which case the total rotation of the switch shaft is limited to the neighborhood of 90° of arc, or he may mount his switch directly on the end of the steering column, in which case the total cycle of revolution of the steering column must be less than two complete revolutions in order that his suppressing means will not operate in any position of the steering gear which does not include the straight-away path. I have found, however, that there are a large number of automotive vehicles wherein the steering column makes more than two revolutions in turning the vehicle. Some of the lighter vehicles turn with a relatively short arc of revolution of the steering wheel, whereas some of the heavier types require as many as three or more turns of the steering wheel to effect their complete turns.

Such a switch as described by Howard cannot be attached directly to the steering column of such latter vehicles, although it is clear to be seen that they are ideally adapted for attachment to the quadrant nut of the same automobile, due to the reduction gears in the steering mechanism itself.

The main object, therefore, of the present invention is to provide a switch which can be attached directly to the steering column of a vehicle, wherein the steering column makes more than one revolution during a turn.

Another object of my invention is to provide a frictionally rotated switch wherein the friction drive is at one speed, whereas the means for suppressing all current through the switch over a definite arc rotates at a relatively low speed.

A still further object of my invention is to provide a double circuit rotary switch, wherein different members thereof may rotate at differential speeds, irrespective of the shaft speed.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawings:

Fig. 1 is a partial view in elevation of a vehicle steering gear showing switch attachment thereto.

Fig. 2 is a longitudinal sectional view of one modification illustrating my invention.

Fig. 3 is a view partly in section and partly in elevation reduced in size taken as indicated by line 3—3 in Fig. 2 and showing a circuit diagram attached thereto. For illustrative purposes the case has been omitted.

Fig. 4 is a view partly in cross section and partly in elevation of another modification of my invention.

Fig. 5 is a partial sectional view taken as indicated by the line 5—5 in Fig. 4.

Figure 6:
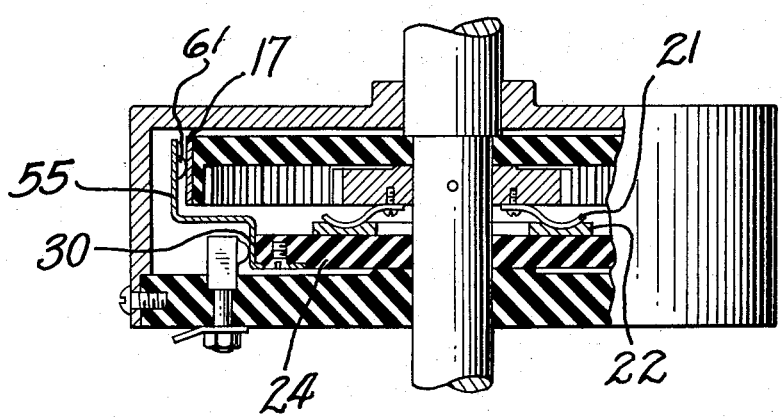
Fig. 6 is a view partially in longitudinal section and partly in elevation of still another modification of my invention.

Referring directly the drawings for a more detailed description of certain illustrative embodiments of my invention as shown therein, a switch case 1 is provided with a central shaft 2. This central shaft may be a separate entity, or it may be a continuation of a steering column 3 of a vehicle which operates steering gear 4 to rotate the usual quadrant arm 5 and tie rod 6 extending to the wheels of the vehicle. In case it is not desirable to provide a long steering column extension, a shorter one may be provided, and shaft 2 coupled therewith by any convenient type of coupling. In either case, shaft 2 will be rotated at steering column speed.

I prefer to make the case 1 cup shape in form, with a single open end opening away from steering gear 4, but it will be obvious to those skilled in the art that other case constructions are equally desirable.

In the modification shown in Figs. 1 and 2, within case 1 and adjacent the closed end thereof is an interrupter disc 10, free to rotate on shaft 2, and preferably positioned by shaft shoulder 11 on one side thereof and by driving gear 12 solidly attached to shaft 2 on the other side thereof. Gear 12 is preferably of insulating material, such as one of the moldable plastics and is keyed to shaft 2.

Mounted on driving gear 12 is an interrupter disc brush 14 bearing against collector ring 15 on the interrupter disc. Collector ring 15 is joined by connection 16 to peripheral conductive ring 17 extending around the periphery of interrupter disc 10 except for a gap 19, this gap being filled with insulating material, so that the entire periphery of the interrupter disc is cylindrical. Common brush 20 bears against the periphery of the interrupter disc, and therefore this brush will make connection with peripheral ring 17 at all times except when the gap 19 is presented thereto. Gap 19 will be referred to later.

Main driving gear 12 has mounted thereon, extending in the opposite direction from and connected to brushes 14, resilient clutch members 21 bearing against conductive clutch ring 22, which in turn bears against an oscillating member 24. Oscillating member 24 is mounted on shaft 2 to rotate thereon by means of the friction developed between clutch ring 22 and the oscillating member, due to the resiliency of resilient clutch members 21. Oscillating member 24 is maintained in position by end plate 25 fixed to case 1 by plate screws 26. End plate 25 is provided with a thrust shoulder 27 against which the oscillating member bears.

The oscillating member 24 supports a pair of peripheral separated moving contacts 30, which are connected together by conductive slip ring 31 positioned beneath clutch ring 22, so that irrespective of the rotation of clutch ring 22, electrical contact will always be made therewith. Likewise, interrupter disc brushes 14 are connected to resilient clutch members 21 through gear 12, and inasmuch as interrupter disc collector ring 15 is connected with peripheral ring 17 on the interrupter disc, the electrical circuit will be made through the switch from either of moving contacts 30 to common brush 20 except when common brush 20 rests upon the insulating gap 19 on the interrupter ring.

Oscillating member 24 is limited in its arc of rotation by stops 34 bearing against stationary contacts 32 attached to end plate 25, these contacts bearing against the periphery of oscillating member 24 at points adjacent moving contacts 30, in such position that when member 24 is oscillated to one end of its allowable path, moving contact 30 on one side will be connected to the stationary contact 32 and disconnected on the other, and the opposite connection of contacts will take place when the oscillating member moves to the other end of its allowed path. Thus, upon any reversal of rotation of shaft 2, oscillating member 24 will immediately turn to contact making position, will thereupon stop rotation, but due to the slip of the clutch, shaft 2 may continue to rotate. Immediately upon reversal of direction, oscillating member 24 will reverse its position, make the opposite connection, be again stopped at the opposite end of its allowed arc of travel, and shaft 2 may continue to rotate in the new direction, due to slipping of the clutch.

In order to rotate interrupter disc 10, I provide internal gear teeth 40 thereon and link these teeth to the main driving gear 12 by an idler gear 41, mounted on idler gear shaft 42 extending from end plate 25. I design the gear ratios in this modification so that the rotation of the interrupter disc will be much slower than the rotation of the main driving gear 12, and thus, even though shaft 2, and consequently steering column 3, is rotated more than one revolution during the steering of the vehicle, the interrupter disc will not rotate a complete revolution. Thus, I am able to confine the interruption of current through the switch, due to the use of interrupting gap 19 on the disc, wholly to the straight-away path including the allowable suppression angle, or to any other predetermined portion of the cycle of rotation of the switch.

I prefer to so design the gear ratio in this modification that the interrupter disc will rotate less than 180° for complete steering of the vehicle, although of course this total angle is not critical. At any rate, for automotive signalling, I prefer to so adjust the gap in peripheral ring 17 that all current through the switch is suppressed over a straight-ahead angle, including the straight-away path of between 10° and 15°, according to circumstances. Other suppression angles may be used for other purposes. The fact that the interrupter disc rotates in opposition to the rotation of the shaft in no way affects the operation of the device.

By allowing the oscillating member to be rotated over its allowable arc of rotation at shaft speed, I get a quick action as far as the make and break of the contacts 30 and 32 are concerned, with a complete control of the suppression angle because of the slower rotation of the interrupter disc.

A simple automotive circuit is shown in Fig. 3. Here, stationary contacts 32 are connected to right and left signal lamps 50 and 51 respectively, which are then grounded. Common brush 20 is connected to source 52, preferably the vehicle battery, the other end of which is grounded. Thereupon, when the entire switch is coupled to steering column 3, so that common brush 20 is within gap 19 over the straight-ahead steering angle, no current will pass through the switch, even though oscillations of the oscillating member do take place and contact made between stationary contacts 32 and moving contacts 30.

However, as soon as the steering column 3 is turned a sufficient amount to move the peripheral ring 17 a sufficient distance to contact stationary contact 20, thereafter any oscillations of the oscillating member, due to rotations and reversals of the steering column, will connect the signal lamps 50 and 51 to the source and thereby illuminate them in accordance with the direction of rotation of the steering column after the initial rotation has been obtained of the interrupter disc 10. After turns have been made away from the straight-away path and the vehicle is returned to the straight-away path, common brush 20 again will be on gap 19 and no current will pass through the device.

Thus, I have provided a switch wherein, even though the main shaft does rotate more than one revolution, the complete suppression of current through the device occurs only at one limited angle in the cycle of rotation of the shaft, and that angle, in the automotive example given, is an angle which includes the straight-away. It is obvious that the width of this angle is for the purpose of preventing signals due to minor variations of the steering mechanism while proceeding in a generally straight-away path.

In Figs. 4 and 5 I have shown another modification of the device, and in this case clutching takes place directly between the slow moving interrupter disc and the oscillating member. Here, oscillating member 24 has the usual moving contacts 30 mounted thereon in the same relationship to stationary contacts 32 as previously described. The main driving gear 12, however, carries no brushes, and is merely a gear meshing with the idler gear 41, as described previously, which in turn meshes with the internal teeth 40 of interrupter disc 10.

Extending from moving contacts 30 are spring arms 55 extending outwardly and then over interrupter disc 10, and terminating in friction shoes 56 bearing directly on peripheral ring 17 on interrupter disc 10. Gap 19 and common brush 20 are in the same position as in the switch previously described.

In operation, the switch shown in Figs. 4 and 5 will perform identical functions as the switch previously described, and differs therefrom only in that the friction clutching is done from the slow moving interrupter disc 10 through friction shoes 56. The make and break of the moving and stationary contacts 30 and 32, respectively, will not be so fast as in the other modification previously described, although in some automotive instances this may be an advantage, particularly in vehicles such as trucks, wherein a large number of revolutions of the steering gear are necessary. It is also possible, in this type of switch, to allow the interrupter disc 10 to rotate just short of 360° if desired, and it will be noticed that I form the peripheral length of shoes 56 longer than the length of gap 19 in order that there be no interruption of current when insulating gap 19 passes under shoes 56.

In Fig. 6 I have shown another modification of my invention. In this case the clutch members 21 bear against clutch ring 22, which in turn bears directly against oscillating member 24 without the use on the oscillating member of slip ring 31. This forms a clutch forming no part of the electrical circuit. Inasmuch, however, as the moving contacts 30 must be connected to peripheral ring 17, these contacts may be directly connected thereto by the use of spring arms 55 as in Figs. 4 and 5, terminating however in peripheral ring contacts 61, these contacts preferably having minimum frictional area contact with peripheral ring 17, so that the friction between ring 17 and brushes 61 will not be sufficient to overcome the clutch friction. Inasmuch as the interrupter disc may be rotated so that not over one-quarter revolution thereof is obtained, brushes 61 will never touch gap 19, but will always be in contact with peripheral ring 17. This modification gives a fast make and break and is simple in structure.

Figure 7:
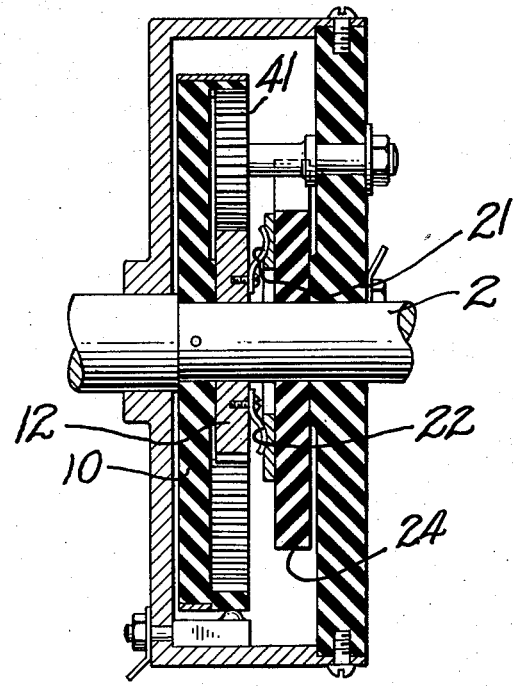
Fig. 7 is a similar view of still another modification for use on a slow moving shaft.

Obviously, following the teachings of the devices herein described, my invention may also be applied to a very slowly moving shaft, and this modification is illustrated in Fig. 7. Here the shaft 2, for example, may rotate only one-half a turn for the entire operational cycle of the switch. Under these circumstances and with the devices previously described, the rotational speed of the oscillating member may be insufficient to create a quick make and break of the signal circuits. Consequently I may desire to fasten the interrupter disc 10 solidly to shaft 2 and mount gear 12 to rotate freely on shaft 2, gear 12 and interrupter disc 10 being connected, as before described, by idler gear 41. Thus it will be seen that the rotation of gear 12 will be at higher speed than the rotation of shaft 2. Oscillating member 24 is provided in the usual manner and frictionally rotated by clutch members 21 and 22. Connection of the moving contacts 30 to peripheral ring 17 may be as described in conjunction with the device of Fig. 6. Thus, even though shaft 20 rotated only for a portion of a revolution, member 24 is oscillated with a higher rotational speed, thus giving a quick make and break. It will, therefore, be seen that the switch Fig. 7 is a reciprocal structure to the switches previously described and in both cases the switches have the common feature that the interrupter disc is rotated less than one revolution, irrespective of the speed of rotation of the oscillating member.

I have therefore provided several modifications, operating in exactly the same manner to produce the same results, the main difference being that in certain modifications I obtain a quick make and break by fast rotation of the oscillating member, whereas in other modifications I obtain a slower make and break due to the slower rotation of the member supplying the clutching power to the oscillating member. All switches have the common feature that the member carrying the interrupting means operating in conjunction with the common brush is rotated less than one complete revolution, irrespective of the main shaft speed.

I would also like to point out that I do not wish to be limited in any manner to the particular gear drive described, inasmuch as there are innumerable gear drives for reducing the speed of rotation of the interrupting disc, and such modifications are deemed to be full equivalents of the means herein used and described.

I also do not wish to be limited to an automotive use for the switches herein described and claimed inasmuch as there are many other uses obvious to those skilled in the art wherein circuits are to be controlled in accordance with the rotation of a shaft.

I claim:

1. In combination with a vehicle steering gear embodying a shaft having a reversing cycle of rotation of more than one revolution, an oscillating member movable on said shaft over a predetermined arc of rotation and limited to said arc, means for frictionally coupling said oscillating member with said shaft, make and break means operated by movement of said oscillating member to open and close a signalling circuit in accordance with direction of rotation of said shaft, and means positively driven by said shaft for interrupting said circuit over a single predetermined portion of the complete rotational cycle of said shaft.

2. Apparatus in accordance with claim 1 wherein the means positively driven by said shaft for interrupting said circuit is a member mounted on said shaft, and geared thereto to rotate less than one revolution during the complete cycle of rotation of said shaft, said latter member operating additional contacts in series with said make and break means to open the signaling circuit over a predetermined arc of rotation of said latter member.

3. Apparatus in accordance with claim 1 wherein the oscillating member is frictionally coupled directly to said shaft.

4. Apparatus in accordance with claim 1 wherein the oscillating member is frictionally coupled to the means positively driven from said shaft for interrupting said circuit.

5. Apparatus in accordance with claim 1 wherein the said shaft is directly rotated by the steering column of a vehicle, said steering column rotating more than one revolution to provide steering, wherein said make and break means selectively open and close a pair of circuits each containing a signal device, and wherein the interrupting means interrupts both of said signalling circuits over a predetermined portion of the rotational cycle of said steering column including the position of said steering column when said vehicle is following a straight ahead path.

6. In combination with a vehicle steering mechanism having a reversing cycle of operation of more than one revolution, a pair of circuits each including a directional signal device, a power supply, contact supporting devices frictionally actuated by movement of said steering gear to connect selectively to said power supply one or the other of said circuits in accordance with the direction of movement of said steering mechanism at any point of rotation thereof, means for maintaining said closure irrespective of continued movement of said steering mechanism in the direction initiating said closure, and means driven by said steering mechanism with a cycle of operation of less than one revolution thereof for positively opening both circuits when said steering mechanism is in central position.

7. In combination with a vehicle steering mechanism having a reversing cycle of operation of more than one revolution, a pair of circuits each including a directional signal device, a power supply, contact supporting devices frictionally rotated by movement of said steering gear to connect selectively to said power supply one or the other of said circuits in accordance with the direction of movement of said steering mechanism at any point of rotation thereof, means for maintaining said closure irrespective of continued movement of said steering mechanism in the direction initiating said closure, and automatic means driven by said steering mechanism with a cycle of operation of less than one revolution thereof for positively opening both circuits whenever said steering mechanism is in a predetermined steering angle including the central position.

8. In combination with a vehicle steering gear, a switch comprising a shaft to be rotated by said steering gear, a pair of driven members mounted on said shaft, make and break means supported by each of said driven members, said make and break means being in series, means for rotating one of said members at shaft speed, means for rotating the other of said members at a different speed, one of said rotating means being a friction clutch, means for limiting the arc of rotation of the member rotated by said friction clutch, and a signalling circuit controlled by said make and break means.

HERBERT E. METCALF.